United States Patent [19]

Cote et al.

[11] Patent Number: 4,899,279

[45] Date of Patent: Feb. 6, 1990

[54] METHOD FOR CONTROLLING AMT SYSTEM INCLUDING WHEEL LOCK-UP DETECTION AND TOLERANCE

[75] Inventors: William F. Cote, Farmington Hills; Robert R. Smyth, Bloomfield Hills, both of Mich.

[73] Assignee: Eaton Corporation, Cleveland, Ohio

[21] Appl. No.: 848,610

[22] Filed: Apr. 7, 1986

[51] Int. Cl.$^4$ .............................................. B60K 41/02
[52] U.S. Cl. ....................... 364/424.05; 364/571.01; 74/866
[58] Field of Search ............... 364/424.1, 426, 571.01; 180/197; 303/92, 93, 99, 103, 114, 116, 115, 100; 188/181 A; 74/866, 858; 73/118.1

[56] References Cited

U.S. PATENT DOCUMENTS

| 4,451,889 | 6/1984 | Beokmann et al. | 364/426 |
| 4,491,919 | 1/1985 | Leiber | 364/426 |
| 4,511,971 | 4/1985 | Dittner et al. | 303/105 |
| 4,545,240 | 8/1985 | Leibner | 303/105 |
| 4,673,226 | 6/1987 | Every et al. | 364/426 |

FOREIGN PATENT DOCUMENTS 1405787 9/1975 United Kingdom .
2090927 7/1982 United Kingdom .

Primary Examiner—Parshotam S. Lall
Assistant Examiner—Ellis B. Ramirez
Attorney, Agent, or Firm—H. D. Gordon

[57] ABSTRACT

A method for controlling an AMT System (10) is provided including sensing the presence of an existing or impending wheel lock-up condition and modifying the method for controlling the system to respond to said wheel lock-up condition in as safe a manner as possible. The method for controlling the AMT System (10) in response to sensing a wheel lock-up condition includes immediately releasing the clutch or coupling (14) and prohibiting the central processing unit (56) from issuing any transmission change gear command output signals.

15 Claims, 3 Drawing Sheets

METHOD FOR CONTROLLING AMT SYSTEM INCLUDING WHEEL LOCK-UP DETECTION AND TOLERANCE

BACKGROUND OF THE INVENTION

1. Field of the Invention

This invention relates to control systems and methods for automatic transmissions providing a plurality of gear reduction ratios, such as automatic mechanical transmission (i.e. "AMT's"). In particular, the present invention relates to control systems and methods for vehicle automatic mechanical transmission systems wherein gear selection and shift decisions are made and executed based upon measured and/or calculated parameters such as vehicle and/or output shaft speed, transmission input shift speed, engine speed, throttle position, rate of change of throttle position, rate of change of vehicle and/or engine speed and the like. More particularly, the present invention relates to a method for controlling a vehicle AMT system including sensing or detecting of a skid or wheel lock-up condition, responding to the detection of a skid condition and system recovery from a skid or wheel lock-up condition.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic transmission control systems for vehicles may be seen by reference to U.S. Pat. Nos. 4,361,060; 4,551,802; 4,527,447; 4,425,620; 4,463,427; 4,081,065; 4,073,203; 4,253,348; 4,038,889; 4,226,295; 3,776,048; 4,208,929; 4,039,061; 3,974,720; 3,478,851 and 3,942,393, the disclosures of which are all hereby incorporated by reference.

Vehicle brake anti-skid or anti-lock systems are also well known in prior art. Briefly, as locking-up or skidding of a vehicle's wheels will provide less than optimal stopping and control of a vehicle, it is desirable to sense actual or impending wheel lock-up and, if such wheel lock-up conditions are sensed, to allow the wheels to roll-up to vehicle speed prior to reapplying the vehicle brakes. Examples of anti-skid or anti-lock brake systems may be seen by reference to U.S. Pat. Nos. 3,767,270; 3,768,872; 3,854,556; 3,920,284; 3,929,382; 3,996,267 and 3,995,912, the disclosures of which are hereby incorporated by reference.

While the above referenced automatic or semi-automatic mechanical transmission (i.e. "AMT") control systems, and similar systems, are effective to control an automatic transmission by selecting a desired gear ratio which will tend to optimize the fuel economy and/or performance of the vehicle in view of the sensed parameters and/or commanding a shift into a selected gear ratio, such control systems were not totally acceptable as the predetermined programs, or control methods, utilized did not include logic to sense an actual or impending lock-up or skid condition (also referred to as wheel lock-up conditions) and/or did not modify the programs to provide optimal operation in view of detection of a wheel lock-up condition.

A wheel lock-up condition presents several problems related to control of a vehicle AMT system, these include the inertia of the engine and clutch on the wheels which may delay the wheels' ability to roll-up to vehicle speed, the circumstance that the value of the output shaft speed signal may not be indicative of vehicle speed during a skid which may cause the transmission system to undesirably attempt one or more rapid downshift and the requirement of providing the system with the ability to revalidate the output shaft speed signal as a true indication of vehicle speed at expected termination of a wheel lock-up condition.

SUMMARY OF THE INVENTION

In accordance with the present invention, the drawbacks of the prior art have been overcome or minimized by providing a control system, preferably an electronic control system, and a control method, for automatic mechanical transmission systems wherein gear selection and shift decisions are made and executed based upon measured and/or calculated parameters including input signals indicative of engine speed, transmission input shaft speed and transmission output shaft speed. Other inputs/parameters, such as signals indicative of throttle position and/or rate of change of throttle position, condition of the master clutch, currently engaged gear ratio, operation of the vehicle brakes, etc. are also utilized to make decisions for control of the AMT system. The method provides for sensing a wheel lock-up condition and modifying the control algorithms in response thereto.

Utilizing an alternate control method or algorithm structured specifically to a sensed non-standard condition, such as a sensed wheel lock-up condition, in place of the control algorithm utilized in the absence of such non-standard conditions is for purposes of describing this invention, referred to a modification to the control algorithm or program by which input signals are processed for issuing the command output signals by which the AMT is controlled.

The above is accomplished by providing the electronic control unit with input means for receiving a signal indicative of a wheel lock-up, such as from a vehicle anti-lock system, and/or includes logic to process the input signals to determine the presence or absence of a wheel lock-up condition. Upon sensing of a wheel lock-up, the control method causes the vehicle clutch, or other completely disengagable coupling, to be and to remain disengaged and ceases all gear changing operations thus allowing the wheels to roll-up to vehicle speed and preventing undesirable downshifting of the transmission. The method further includes sensing conditions indicative of wheel lock-up condition terminated and, in response to sensing possible wheel lock-up condition termination, steps for verification of the output shaft speed signal indication of vehicle speed, allowing normal operation of the AMT system to resume.

Accordingly, it is an object of the present invention to provide a new and improved method for controlling a vehicle AMT system including sensing of wheel lock-up conditions and modifying of the system control algorithm in tolerance of such sensed lock-up conditions.

This and other objects and advantages of the present invention will become apparent from a reading of the description of the preferred embodiment taken in connection with the attached drawings.

DESCRIPTION OF THE PREFERRED EMBODIMENT

Figure 1:
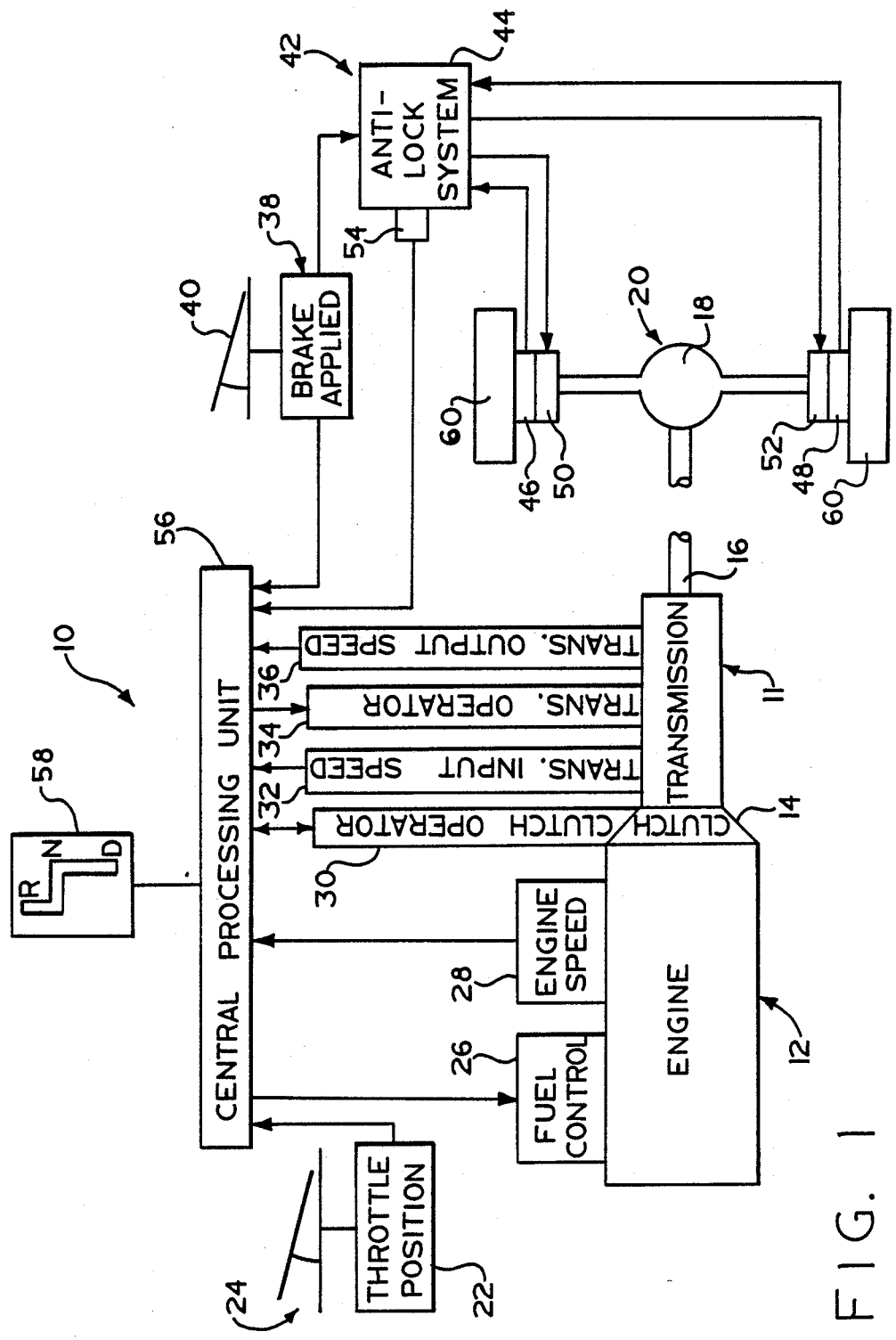
FIG. 1 is a schematic illustration of the components and interconnections of the automatic mechanical transmission control system of the present invention.
Figure 2A:
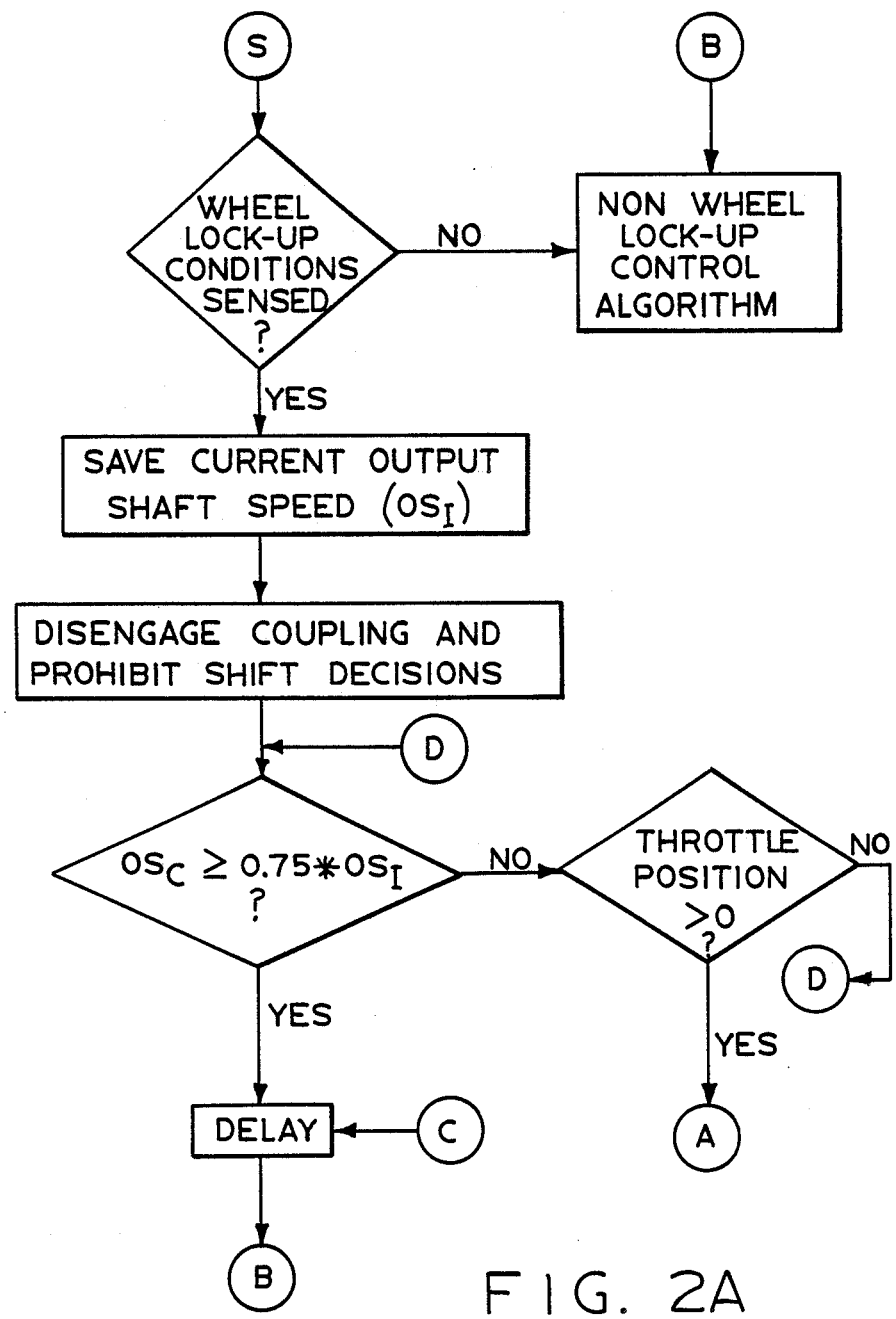
FIGS. 2A-2B are symbolic illustrations, in the form of a flow chart, illustrating the preferred manner of practicing the method of the present invention.
Figure 2B:
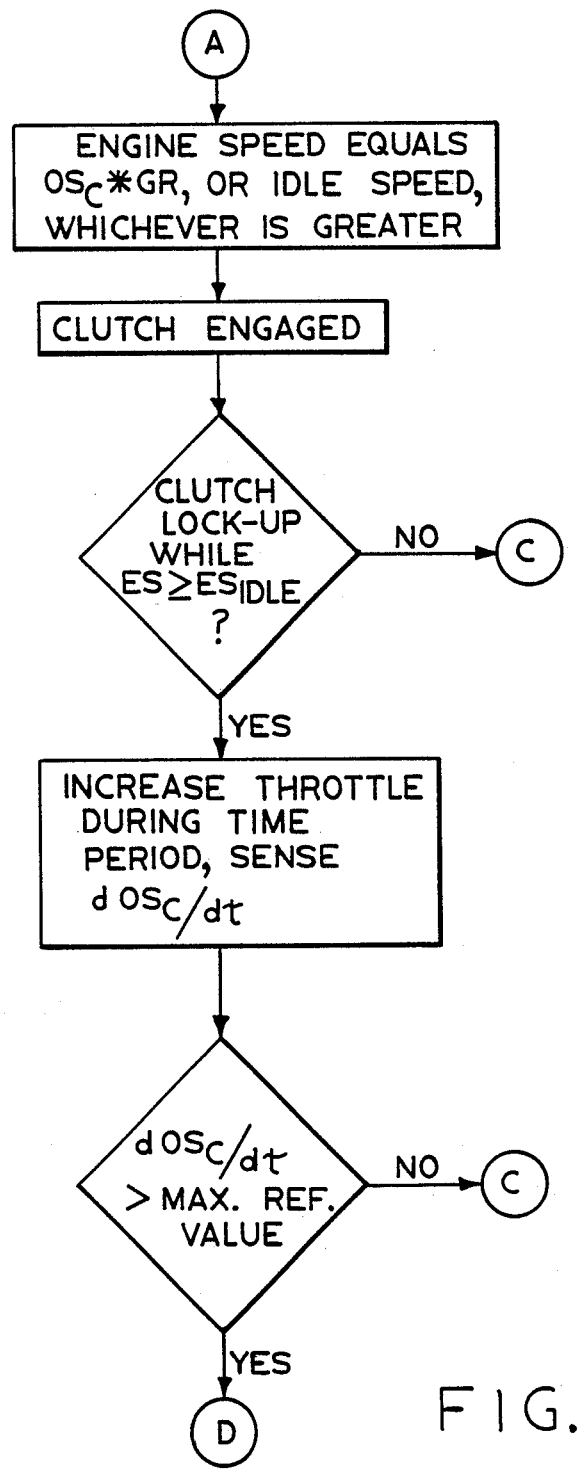

FIG. 1 schematically illustrates a vehicular automatic mechanical transmission system 10 including an automatic multi-speed change gear transmission 11 driven by a throttle control engine 12, such as a well known diesel engine, through a master clutch 14. The output of automatic transmission 11 is output shaft 16 which is adapted for driving connection to an appropriate vehicle component such as the differential head assembly 18 of a vehicle drive axle 20. The above-mentioned power train components are acted upon and monitored by several devices each of which will be discussed in greater detail below. These devices include a throttle position or throttle opening monitor assembly 22 which senses position of the operator controlled vehicle throttle or other fuel throttling device 24, a fuel control device 26 for controlling the amount of fuel to be supplied to the engine 12, an engine speed sensor 28 which senses the rotational speed of the engine, a clutch operator 30 which engages and disengages master clutch 14 and which may also supply information as to the status of the clutch, a transmission input shaft speed sensor 32, a transmission operator 34 which is effective to shift the transmission 11 into a selected gear ratio and which may provide a signal indicative of the currently engaged gear ratio, and a transmission output shaft speed sensor 36. Alternatively, the currently engaged ratio may be determined by comparison of input shaft to output shaft speeds. A vehicle brake monitor 38 may be provided for sensing actuation of the vehicle brake pedal 40.

The vehicle may also be provided with a vehicle anti-lock system as is well known in the prior art and indicated generally at 42. Briefly, the anti-lock system includes a central anti-lock logic unit 44 which receives input signals from various wheel speed sensors such as sensors 46 and 48 for determination as to the existence of an actual or impending wheel lock-up condition and issues output commands to brake operators 50 and 52 to optimize stopping and control of the vehicle as is well known in the prior art. If the vehicle is equipped with an anti-lock system 42, the system may provide an input signal by means of skid or lock-up sensor 54 to the AMT system 10.

The above mentioned AMT system devices supply information to or accept commands from a central processing unit or control 56. The central processing unit 56 may include analogue and/or digital electronic logic hardware or, preferably, is microprocessor based and utilizes logic in a software mode. The central processing unit 56 also receives information from a shift control assembly 58 by which the vehicle operator may select a reverse (R), neutral (N) or forward drive (D) mode of operation of the vehicle. An electrical power source (not shown) and/or source of pressurized fluid (not shown) provides electrical and/or pneumatic power to the various sensing, operating, and/or processing units. Drive train components and controls therefore of the type described above are known in the prior art and may be appreciated in greater detail by reference to above-mentioned U.S. Pat. Nos. 3,478,851, 3,776,048; 4,038,889; 4,081,065; 4,226,295 and 4,361,060.

Sensors 22, 28, 32, 36, 38, 54 and/or 58 may be of any known type or construction for generating analogue of digital signals proportional to the parameter monitored thereby. Similarly, operators 26, 30, 34, 50 and 52 may be of any known electrical, pneumatic or electropneumatic type executing operations in response to command signals from processing unit 56 or 44. The fuel control actuator 26 will normally supply fuel to engine 12 in accordance with the operator setting of throttle 24 but may supply a lesser (fuel dip) or greater (fuel boost) amount of fuel in accordance with command from control unit 56.

The purpose of the central processing unit 56 is to select, in accordance with a program (i.e. predetermined logic rules) and current or stored parameters, the optimum gear ratio in which transmission 11 should be operating and, if necessary, to command a gear change or shift into the selected optimal gear ratio based upon the current and/or stored information.

The various functions to be performed by CPU 56, and a preferred manner of performing same may be seen in greater detail by reference to allowed U.S. patent application Ser. No. 659,114, now U.S. Pat. No. 4,595,986, filed Oct. 10, 1984 and to published Society of Automotive Engineers SAE Paper No. 831776 published Nov. 1983, the disclosures of which thereby incorporated by reference.

In the event of a wheel lock-up or skid condition, it is important that the AMT system control logic be provided with a method to detect such conditions as the input signal from sensor 36 indicative of the rotational speed of the transmission output shaft may not provide a true indication of the velocity of the vehicle and thus the system may attempt undesirable downshifts of transmission 11. Further, it is desirable that the inertia of engine 12 and clutch 14 and be disconnected from the braked vehicle drive wheels 60 allowing same to quickly roll-up to vehicle speed to provide an optimal vehicle stopping and control situation.

Sensing of an actual or impending wheel lock-up condition by the AMT central processing unit 56 is relatively simple and may comprise, in the alternative, providing for receiving a signal from a vehicle anti-lock system 42 if the vehicle is provided with such an anti-lock system or, by differentiating the signal from transmission output shaft speed sensor 36 and comparing same to a reference signal corresponding or related to the maximum possible rate of deceleration of the output shaft when the tires are maintaining a rolling friction with the road. When a vehicle goes into a skid, the tires 60, and thus output shaft 16, decelerate at a rate much greater than that possible if rolling friction is maintained. Therefore, whenever an output shaft deceleration is detected which exceeds the maximum rate possible for a rolling tire, it must be a skid condition. As soon as a skid is detected, the current output shaft speed is saved so that it can be used later in a skid recovery algorithm as will be discussed in greater detail below.

After detecting that a skid or wheel lock-up condition exists, it is necessary for the system 10, to respond to the detected condition in a safe a manner as possible. The operational logic, or method of controlling the AMT system 10 in response to the detecting of a skid condition is to immediately release the clutch or coupling 14 and to inhibit the central processing unit 56 from attempting a transmission gear change. The above response allows the vehicle operator to ride out the skid episode without having to fight engine torque and free from worry that the transmission system 10 will decide to downshift during the skid. Both are important as releasing the coupling 14 allows the braked wheels 60 to roll-up to vehicle speed unimpeded by the inertia of the engine 12 and input plates of clutch 14 while prohibiting gear changes in transmission 11 prevents output shaft speed signals, which are not truly representative of vehicle speed during a wheel lock-up, to cause the logic to attempt an undesirable single or multiple downshift.

It is implicit in the skid tolerance logic of the present method that the skid or wheel lock-up was initiated by excessive brake torque being applied on a slippery surface. Therefore, the throttle 24 is not being applied, the engine 12 will automatically idle down and the output shaft speed will be at a minimal value and will not be indicative of vehicle speed. Until the output shaft speed obtains a predetermined percentage of prelock-up value and/or throttle 12 is reapplied it is assumed that the skid is still proceeding causing the clutch 14 to remain disengaged and all shift commands from controller 56 to remain prohibited.

The present method allows the logic to sense possible termination of a previously detected skid condition and provides steps to verify that, and/or cause the output shaft speed input signal from sensor 36 is representative of vehicle speed.

First, the current output shaft speed ("$OS_c$") is compared against the output shaft speed ("$OS_I$") saved when the skid was first detected. If the current output shaft speed is equal to or greater than a predetermined percentage, such as 75%, of the saved output shaft speed, it is presumed to be correct (i.e. representative of vehicle speed) and after a short delay, skid recovery is allowed to proceed by resuming control of the AMT system 10 by the non-wheel lock-up control algorithms. If, on the other hand, current output shaft speed, $OS_c$, did not recover to 75% of the saved output shaft speed, $OS_I$, it is necessary to take further steps to determine if the vehicle is still skidding. The vehicle operator reapplying the throttle 24, as sensed by throttle position sensor 22, is taken as an indication that the skid condition has probably ended and the operator wishes the vehicle to proceed in a normal manner. Upon sensing reapplication of the throttle 24, the AMT system logic is provided with a method to make a decision as to whether the information being provided by the output shaft speed sensor 36 is correct (i.e. indicative of vehicle speed) or if one or more of the vehicle drive wheels is still sliding. A two-step method is utilized to make this logic decision.

In order to determine if the drive wheels are still sliding, and to cause the drive wheels not to slide, engine speed is synchronized with the greater of output shaft speed times gear ratio, or engine idle speed, and the clutch 14 is applied. If clutch lock-up is achieved then the throttle is smoothly increased up to a reference value no greater then the point requested by the driver. Clutch 14 lock-up is considered to occur if the clutch can be fully engaged without stalling the engine. During a short delay, such as one-half of a second, after clutch lock-up is achieved, the change in output shaft speed is calculated and compared to reference equal to greatest expect output shaft acceleration ($dOS/dt$) under rolling friction conditions. If $dOS/dt$ does not exceed the reference, the skid is considered to have terminated.

If clutch lock-up could not be achieved on the initial attempt it is assumed that the vehicle has skidded down to a stop or at least a very low speed and the output shaft speed input signal is truly representative of vehicle speed. Transmission shift decisions are permitted to proceed and, after a short delay, such as one-half of one second, the clutch 14 can be reapplied.

As stated above, the central processing unit 56 receives various input signals and processes these and/or stored information in accordance with a program of predetermined logic rules to issue command output signals for operation of the AMT System 10. Periodically, preferably at least once during each period of time in which the various mechanical actuators can react to a command output signal, the logic will verify the existence or non-existence of a wheel lock-up condition and, if necessary, adopt a set of logic rules or method of operation tolerant to said sensed condition. Assuming central processing unit 56 is a microprocessor base control unit, a complete cycle of processing current and stored parameters and issuing command output signals can be accomplished in less than 15–20 milliseconds while a typical mechanical actuator, such as a solenoid controlled valve or the like, will require a minimum of 20–30 milliseconds to cause even initial movements of a controlled member.

Although the AMT System 10 has been described as utilizing a microprocessor base central processing unit 56 and the methods and operations carried out as software modes or algorithms, it is clear that the operations can also be carried out in electronic/fluidic logic circuits comprising a discrete hardware components.

The clutch operator 30 is preferably controlled by the central processing unit 56 and may engage and disengage master clutch 14 as described in above-mentioned U.S. Pat. No. 4,081,065. Transmission 11 may include synchronizing means, such as an accelerator and for a brake mechanism as described in above-mentioned U.S. Pat. No. 3,478,851. The transmission 11 is preferably, but not necessarily, of the twin countershaft type as seen in U.S. Pat. No. 3,105,395, hereby incorporated by reference.

Although the present invention has been set forth with a certain degree of particularity, it is understood that the various modifications are possible without departing from the spirit and the scope of the invention as hereinafter claimed.

We claim:

1. A control method for controlling a vehicular automatic mechanical transmission system utilized in connection with a vehicle equipped with vehicle wheel brakes for retarding the rotation of at least one of the vehicle drive wheels, said automatic mechanical transmission system comprising a throttle-controlled engine, a change gear transmission having a plurality of gear ratio combinations selectably engagable between a transmission input shaft and the transmission output shaft, said transmission output shaft drivingly coupled to said vehicle drive wheels, and a disengagable coupling drivingly interposed said engine and said transmission input shaft, said automatic mechanical transmission system additionally comprising an information processing unit having means for receiving a plurality of input signals including (1) an input signal indicative of the rotational speed of said transmission output shaft, and (2) an input signal indicative of operator set throttle position, said processing unit including means for processing said input signals in accordance with a program to provide a predetermined gear ratio for a given combination of input signals and for generating command output signals whereby said transmission system is operated in accordance with said program, and means associated with said transmission system effective to actuate said transmission system to effect engagement of one of said gear ratio combination in response to said output signals from said processing unit, the method characterized by:

sensing the presence of a wheel lock-up condition; and if the presence of a wheel lock-up condition is sensed, causing said coupling to be immediately disengaged, and then processing said input signals to determine if said previously sensed existing or impending wheel lock conditions have terminated if, after sensing the presence of a wheel lock-up condition, the sensed throttle position exceeds a predetermined minimum reference value.

2. The control method of claim 1 wherein sensing the presence of a wheel lock-up condition comprises differentiating with respect to time the value of the current input signal indicative of the rotational speed of the transmission output shaft and comparing said differentiated value to a reference value related to the maximum transmission output shaft deceleration possible if rolling friction is maintained at the vehicle drive wheels.

3. The control method of claim 1 wherein said vehicle is equipped with a vehicle brake anti-lock system and said sensing of the presence of a wheel lock-up condition comprises receiving an input signal indicative of the presence of a wheel lock-up condition from said anti-lock system.

4. The control method of claim 1 wherein said input signals additionally include (3) an input signal indicative of a rotational speed of said engine, (4) an input signal indicative of the rotational speed of said transmission input shaft, and (6) an input signal indicative of the engaged and disengaged conditions of said coupling, said method including the further steps of:

causing said engine to rotate at a speed substantially equal to the speed of said input shaft;
actuating the coupling;
determing if the clutch can be fully engaged while maintaining the engine speed equal to the transmission input shaft speed but greater than the stall speed of the engine;
returning to the non-wheel lock-up control algorithm for said automatic mechanical transmission system of said coupling can not be fully engaged with said engine maintained at input shaft without stalling same; and
if said coupling can be fully engaged with said engine maintained at input shaft rotational speed with stalling the engine, causing the fuel supply of said engine to be set equal to a predetermined value, monitoring a test value indicative of the change of output shaft speed with respect to time, and returning to the non-wheel lock-up control algorithm if said test value does not exceed a maximum reference value.

5. The control method of claim 1 wherein said input signals additionally include (3) an input signal indicative of a rotational speed of said engine, (4) an input signal indicative of the rotational speed of said transmission input shaft, and (6) an input signal indicative of the engaged and disengaged conditions of said coupling, said method including the further steps of:

causing said engine to rotate at a speed substantially equal to the speed of said input shaft;
actuating the coupling;
determining if the clutch can be fully engaged while maintaining the engine speed equal to the transmission input shaft speed but greater than the stall speed of the engine;
returning to the non-wheel lock-up control algorithm for said automatic mechanical transmission system of said coupling can not be fully engaged with said engine maintained at input shaft speed without stalling same; and
if said coupling can be fully engaged with said engine maintained at input shaft rotational speed with stalling the engine, causing the fuel supply of said engine to be set equal to a predetermined value, monitoring a test value indicative of the change of output shaft speed with respect to time, and returning to the non-wheel lock-up control algorithm if said test value does not exceed a maximum reference value.

6. The control method of claim 1 wherein said input signals additionally include (3) an input signal indicative of a rotational speed of said engine, (4) an input signal indicative of the rotational speed of said transmission input shaft, and (6) an input signal indicative of the engaged an disengaged conditions of said coupling, said method including the further steps of:

causing said engine to rotate at a speed substantially equal to the speed of said input shaft;
actuating the coupling;
determining if the clutch can be fully engaged while maintaining the engine speed equal to the transmission input shaft speed but greater than the stall speed of the engine;
returning to the non-wheel lock-up control algorithm for said automatic mechanical transmission system of said coupling can not be fully engaged with said engine maintained at input shaft speed without stalling same; and
if said coupling can be fully engaged with said engine maintained at input shaft rotational speed with stalling at the engine, causing the fuel supply of said engine to be set equal to a predetermined value, monitoring a test value indicative of the change of output shaft speed with respect to time, and returning to the non-wheel lock-up control algorithm if said test value does not exceed a maximum reference value.

7. The control method of claim 1 further characterized by, if the presence of a wheel lock-up condition is sensed, prohibiting said processing unit from generating all transmission gear change command output signals.

8. The control method of claim 7 wherein said vehicle is equipped with a vehicle brake anti-lock system and said sensing of the presence of a wheel lock-up condition comprises receiving an input signal indicative of the presence of a wheel lock-up condition from said anti-lock system.

9. The control method of claim 7, wherein sensing the presence of a wheel lock-up condition comprises differentiating with respect to time the value of the current input signal indicative of the rotational speed of the transmission output shaft in comparing said differentiated value to a reference value corresponding generally to the maximum transmission output shaft deceleration possible if rolling friction is maintained at the vehicle drive wheels.

10. The control method of claim 9 comprising the additional steps of:

saving the initial value of the input signal indicative of output shaft speed at the time that the presence of wheel lock-up condition is sensed;

sensing the current value of the input signal indicative of the rotational speed of the output shaft;

said determining if the presence of a wheel lock-up condition has terminated additionally comprising:

comparing the current value of the input signal indicative of output shaft speed to a predetermined percentage of the initial value of said, input signal indicative of the rotational speed of the output shaft; and returning to the non-wheel lock condition control algorithms if said current input signal value exceeds said percentage of said initial input signal value.

11. The control method of claim 7 comprising the additional steps of:

saving the initial value of the input signal indicative of output shaft speed at the time that the presence of wheel lock-up condition is sensed;

sensing the current value of the input signal indicative of the rotational speed of the output shaft;

said determining if the presence of a wheel lock-up condition has terminated additionally comprising:

comparing the current value of the input signal indicative of output shaft speed to a predetermined percentage of the initial value of said, input signal indicative of the rotational speed of the output shaft; and returning to the non-wheel lock condition control algorithms if said current input signal value exceeds said percentage of said initial input signal value.

12. The control method of claim 11 wherein the predetermined percentage is in the range of 50%-80%.

13. The control method of claim 1 comprising the additional steps of:

saving the initial value of the input signal indicative of output shaft speed at the time that the presence of wheel lock-up condition is sensed;

sensing the current value of the input signal indicative of the rotational speed of the output shaft;

said determining if the presence of a wheel lock-up condition has terminated additionally comprising:

comparing the current value of the input signal indicative of output shaft speed to a predetermined percentage of the initial value of said, input signal indicative of the rotational speed of the output shaft; and returning to the non-wheel lock condition control algorithms if said current input signal value exceeds said percentage of said initial input signal value.

14. The control method of claim 13 wherein the predetermined percentage is in the range of 50%-80%.

15. A control system for controlling a vehicular automatic mechanical transmission system utilized in connection with a vehicle equipped with vehicle wheel brakes for retarding the rotation of at least one of the vehicle drive wheels, said automatic mechanical transmission system comprising a throttle-controlled engine, a change gear transmission having a plurality of gear ratio combinations selectably engagable between a transmission input shaft and the transmission output shaft, said transmission output shaft drivingly coupled to said vehicle drive wheels, and a disengagable coupling drivingly interposed said engine and said transmission input shaft, said automatic mechanical transmission system additionally comprising an information processing unit having means for receiving a plurality of input signals including (1) an input signal indicative of the rotational speed of said transmission output shaft, said processing unit including means for processing said input signals in accordance with a program to provide a predetermined gear ratio for a given combination of input signals and for generating command output signals whereby said transmission system is operated in accordance with said program, and means associated with said transmission system effective to actuate said transmission system to effect engagement of one of said gear ratio combinations in response to said output signals from said processing unit, the system characterized by:

means for sensing the presence of wheel lock-up condition, and, if and as long as the presence of a wheel lock-up condition is sensed, prohibiting said processing unit from generating all transmission gear change command output signals.

* * * * *